United States Patent [19]

Saint-Joigny et al.

[11] Patent Number: 5,204,863
[45] Date of Patent: Apr. 20, 1993

[54] DEVICE FOR MONITORING THE OPERATION OF A MICROPROCESSOR SYSTEM, OR THE LIKE

[75] Inventors: Frédéric Saint-Joigny, Paris; Alain Sague, Rueil-Malmaison, both of France

[73] Assignee: Valeo Neiman, Croissy-sur-Seine, France

[21] Appl. No.: 652,433

[22] Filed: Feb. 8, 1991

[30] Foreign Application Priority Data

Feb. 9, 1990 [FR] France .................. 90 01542

[51] Int. Cl.$^5$ .................................................. G06F 11/30
[52] U.S. Cl. ...................................... 371/16.3; 371/25.1
[58] Field of Search ............ 371/163, 25.1, 61, 5.4, 371/12

[56] References Cited

U.S. PATENT DOCUMENTS

| | | |
|---|---|---|
| 4,403,185 | 9/1983 | Charles . |
| 5,048,017 | 9/1991 | Breneman .................. 371/16.3 |
| 5,073,853 | 12/1991 | Johnson ..................... 371/16.3 |

FOREIGN PATENT DOCUMENTS

| | | |
|---|---|---|
| 3328027 | 2/1985 | Fed. Rep. of Germany . |
| 3516900 | 1/1987 | Fed. Rep. of Germany . |
| 3836870 | 5/1989 | Fed. Rep. of Germany . |
| 8804074 | 6/1988 | PCT Int'l Appl. . |
| 2120428 | 11/1983 | United Kingdom . |

OTHER PUBLICATIONS

Patent abstracts of Japan, vol. 9, No. 232 (P-389) [1955], Sep. 18, 1985; JP-A-60 086 627 (Hanshin Electric K.K.) May 16, 1985, Abrege.

*Primary Examiner*—Vincent P. Canney

[57] ABSTRACT

A device for monitoring the operation of a microprocessor and capable of generating an error signal whenever the frequency of a signal derived from the microprocessor crosses an upper or a lower frequency threshold comprises: an oscillator periodically producing a monotonically varying voltage and including a threshold circuit, the oscillator generating an error signal when the monotonically varying voltage crosses a threshold, and including a reset input for returning the monotonically varying voltage to level closer to its starting voltage; and a treatment circuit for treating the derived signal and generating pulses on the input at the frequency of the derived signal so long as the frequency is no greater than the upper threshold, otherwise applying no pulse to the input. When pulses are produced at a lower frequency, the time interval between two reset pulses is greater than the time interval required for the monotonically varying voltage to reach the threshold voltage.

6 Claims, 2 Drawing Sheets

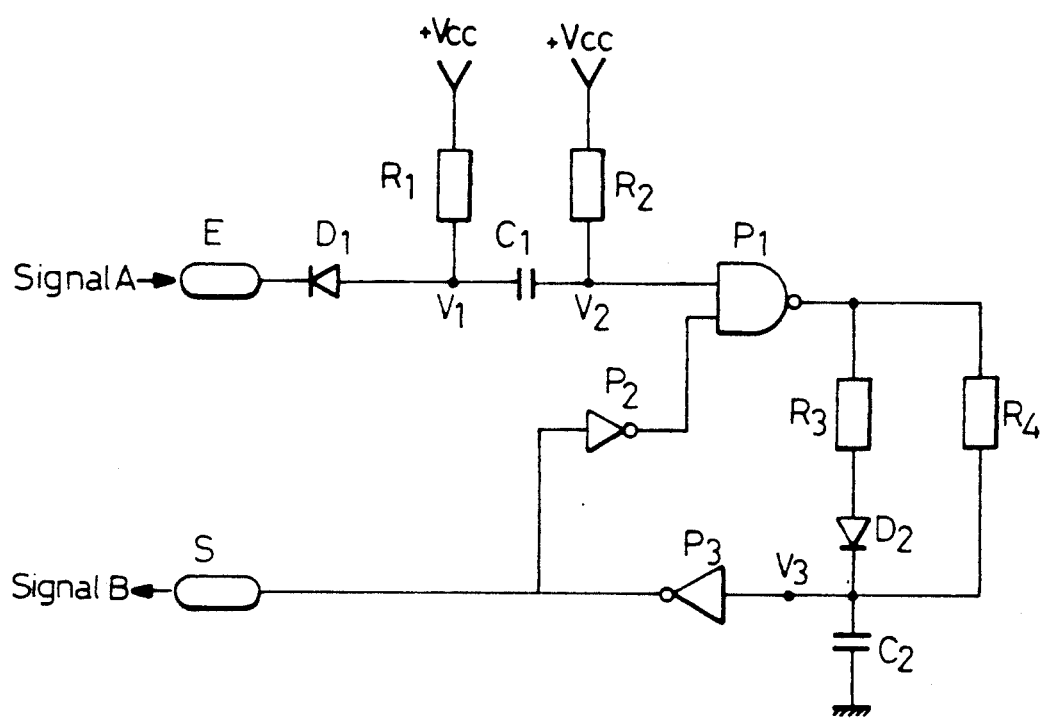
FIG_1

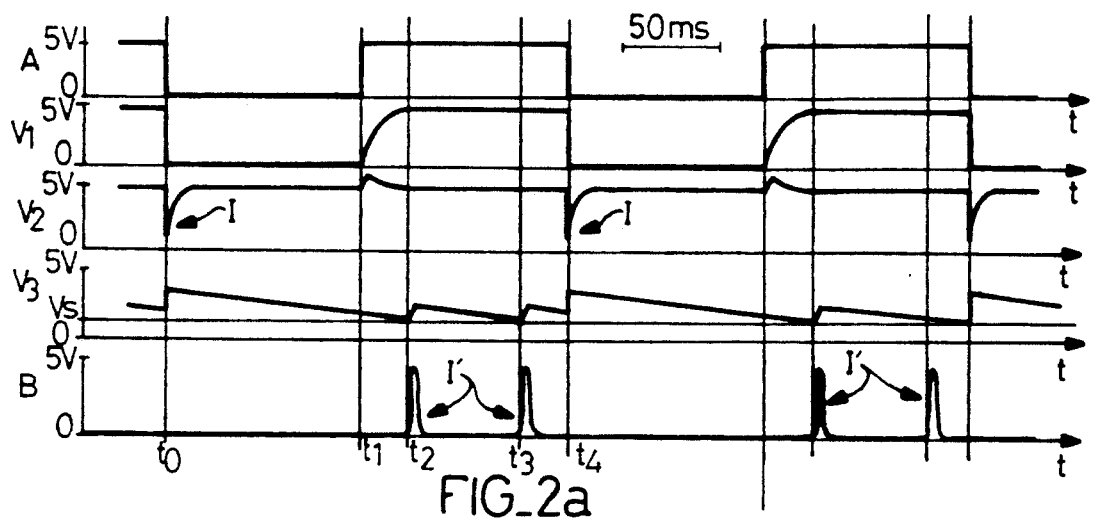
FIG_2a
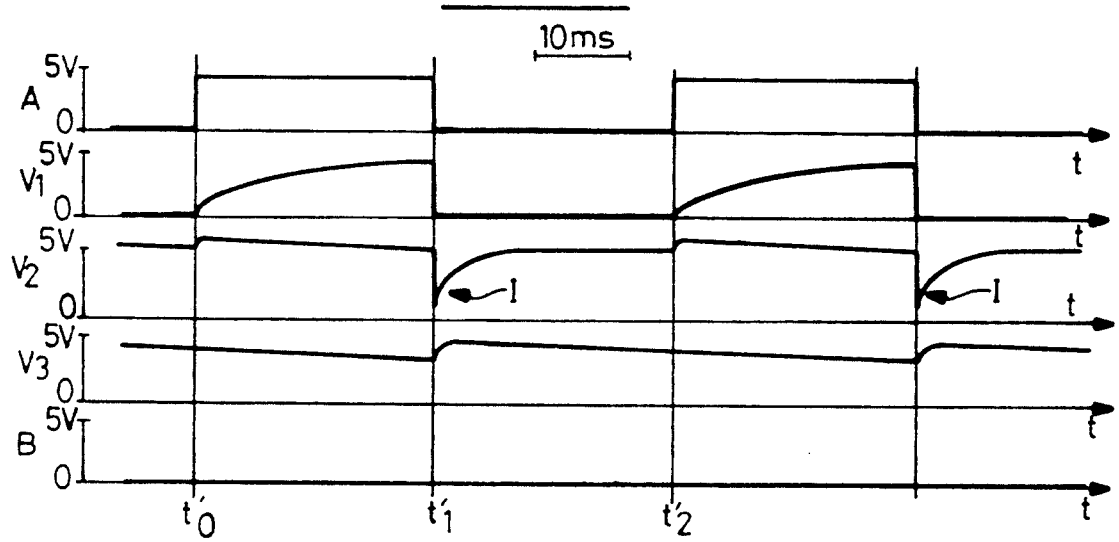
FIG_2b
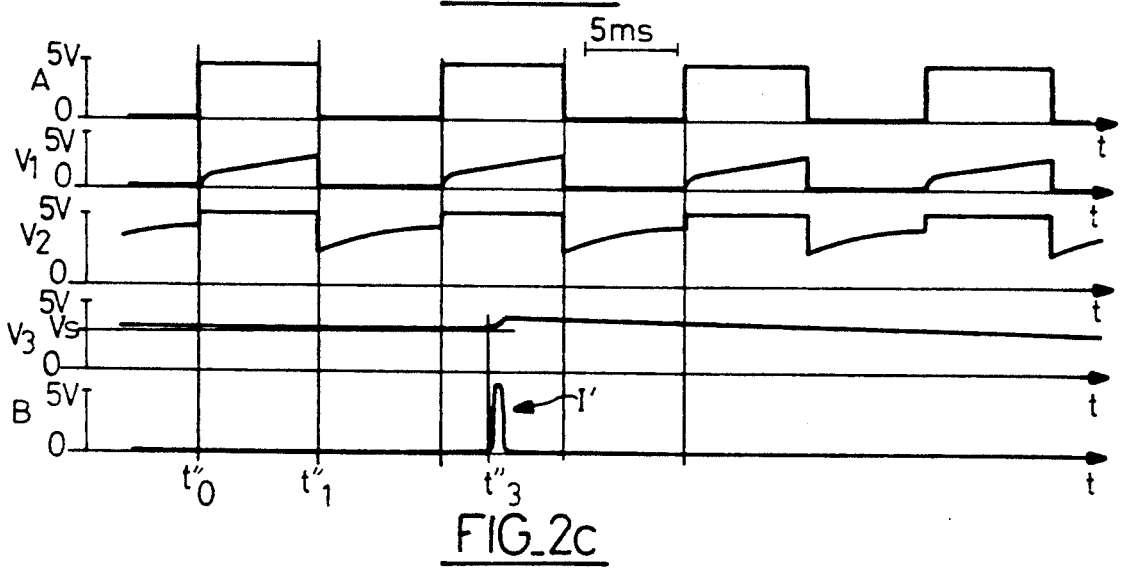
FIG_2c

DEVICE FOR MONITORING THE OPERATION OF A MICROPROCESSOR SYSTEM, OR THE LIKE

The present invention relates in general to monitoring the operation of microprocessor circuits or the like.

BACKGROUND OF THE INVENTION

The prior art already includes monitoring devices which operate on the basis of observing the frequency of a signal derived from the microprocessor circuit, and generating an error signal when the frequency moves outside an allowed range of frequencies extending between a lower threshold and an upper threshold.

Several types of derived signal can be envisaged for detecting operating defects having various causes. Particular mention may be made of the following:

a change in the system clock signal, e.g. due to the oscillator loosing synchronization;

a program running an endless loop;

a special subprogram being run which is dedicated to producing the above-mentioned derived signal; and the microprocessor operating an unknown instruction.

Depending on the type of derived signal that is used, the prior art monitoring device is capable of generating a signal indicating that the corresponding operating fault has occurred.

However, all prior devices are disadvantageous in that they are constituted by electronic circuits that are complex and therefore expensive.

In addition, these devices have high electricity consumption, and this aspect becomes of vital importance when monitoring a microprocessor system mounted on board a vehicle and powered by the battery thereof. It is essential to maintain the battery at a suitable level of charge even when the monitoring device is in service for a long period of time.

The present invention seeks to mitigate these drawbacks of the prior art and to provide a monitoring device of the type mentioned above which is extremely simple and cheap in structure and which consumes very little electricity.

SUMMARY OF THE INVENTION

To this end, the present invention provides a device comprising:

an oscillator capable of producing a periodic voltage which varies monotonically from a starting voltage, and including a threshold circuit to which said monotonically varying voltage is applied and which is capable of generating an error signal on an output of the device each time said monotonically varying voltage crosses a determined voltage threshold, said oscillator also including a reset input which, on receiving a reset pulse, serves to return the monotonically varying voltage to a level closer to its staring voltage; and a treatment circuit for treating the derived signal and capable of applying reset pulses to said reset input at a frequency equal to the frequency of the derived signal when said frequency is not greater than the upper frequency threshold, and to apply no reset pulse when the frequency of the derived signal exceeds said upper threshold frequency; the rate at which said monotonically varying voltage varies being such that when said reset pulses are produced at a frequency lower than said lower frequency threshold, the time interval between two successive reset pulses is greater than the time interval required for the monotonically varying voltage to go from the starting voltage to the threshold voltage.

Preferably, the oscillator comprises a capacitor, a charging resistor for charging the capacitor quickly, a discharging resistor for discharging the capacitor slowly, and a gate whose output controls charging and discharging of the capacitor, the threshold treatment circuit is included in a feedback loop between the capacitor and one of the inputs of the gate, and another input of the gate constitutes the reset input.

Advantageously, the charging resistor and the discharging resistor are connected in parallel between the output of the gate and a first terminal of the capacitor, a diode is connected in series with the charging resistors, and the second terminal of the capacitor is connected to ground.

Preferably, the feedback loop includes two logic inverters in series, with the inverter connected to the capacitor constituting the threshold circuit.

The gate is advantageously a NAND gate.

In an advantageous embodiment, the treatment circuit comprises a diode whose cathode is connected to the derived signal input and whose anode is connected to a first terminal of a first resistor and to a first terminal of a capacitor, the second terminal of the capacitor being connected to a first terminal of a second resistor and to the reset input of the oscillator, the second terminals of the first and second resistors being connected to a DC voltage source.

Finally, the error signal is preferably an initialization pulse for the microprocessor, or a succession of such pulses.

BRIEF DESCRIPTION OF THE DRAWINGS

An embodiment of the invention is described by way of example with reference to the accompanying drawings, in which:

FIG. 1 is a circuit diagram of a preferred embodiment of a monitoring device of the present invention; and FIGS. 2a to 2c are sets of timing diagrams showing the behavior of the circuit of FIG. 1 under three different sets of circumstances.

DETAILED DESCRIPTION

With reference initially to FIG. 1 a preferred embodiment of a circuit of the invention comprises an input terminal E for a signal A on which monitoring is based, and an output terminal S on which a signal B is generated which may include re-initializing pulses for the system being monitored in the event that an operating fault is observed therein.

The circuit is powered by a signal DC voltage plus Vcc, e.g. +5 volts.

The input terminal E is connected to the cathode of a first diode D1 whose anode is connected firstly to a first terminal of a resistor R1 and second to a first terminal of a capacitor C1. The second terminal of R1 is connected to +Vcc. The second terminal of C1 is connected to a first terminal of a resistor R2 and also to a first input of a NAND gate given reference P1. The second terminal of R2 is connected to +Vcc.

the output of gate P1 is connected to a first terminal of a resistor R3 and to a first terminal of a resistor R4. The second terminal of R3 is connected to the anode of a second diode D2. The cathode of the diode is connected to a first terminal of a second capacitor C2 whose second terminal is connected to ground (0 V). The second terminal R4 is connected to the terminal C2. The cathode of D2, the second terminal of R4, and the first terminal of C2 are all connected to the input of an inverter P3 whose output is connected to the output terminal S of the circuit. The output of P3 is also connected to the input of another inverter P2 whose output is connected to the second input of P1.

The items P1, P2, and P3 are preferably constituted using a signal quad NAND gate chip in which both inputs of some of the NAND gates are connected together to cause them to operate as inverters.

In addition, various intermediate voltages present in the circuit of FIG. 1 are designated as follows:

V1: the voltage at the anode of D1;
V2: the voltage at the first input of P1; and
V3: the voltage at the input of P3.

The operation of the circuit as described above is now explained with reference to FIGS. 2a to 2c. In the explanation, it is assumed that the threshold voltages of the diodes are negligible. It should also be observed that the time scales of the various timing diagrams of FIGS. 2a to 2c are different and that they are marked graphically.

The timing diagrams of FIG. 2 correspond to the signal A as applied to input E having a frequency $F_A$ which is lower than a first threshold frequency written $F_{MIN}$.

The signal A is a logic signal essentially in the form of a squarewave varying between 0 volts and 5 volts.

When the signal A is initially at 5 volts, V1 and V2 are at the same potential and C1 is discharged.

When A switches from 5 volts to 0 volts (instant $t_0$, D1 conducts and V1 switches immediately to 0 volts and remains there so long as A does not change. V2 also switches immediately to 0 volts, but thereafter C1 charges quickly through R2 so as to bring V2 back to 5 volts along a charging curve characterized by time constant R2C1. V2 then remains at this value so long as A does not change.

When A switches again from 0 volts to 5 volts (instant $t_1$), diode D1 is non-conducting, such that C1 discharges by a current flowing through R1. V1 therefore rises up to 5 volts following a discharge curve characterized by the time constant R1C1, as shown, and then stabilizes at 5 volts. Simultaneously, a small excess voltage is established at V2 which dies away during discharging by current which also flows through R2.

The signal V2 applied to the first input of P1 therefore defines a series of zero-volt pulses I (in particular at instants $t_0$ and $t_4$) while remaining close to +5 volts at other times. It may be observed that these pulses occur at the frequency $F_A$.

It may be observed here that the circuit constituted by P1, P2, P3, R3, R4, D2, and C2 is an oscillator whose behavior is influenced by the signal V2 present on the first terminal of P1.

Assume that V2 is initially continuously at +5 volts. In this case, P1 behaves as an inverter with respect to the signal applied to its second input.

Assume also that the second input of P1 is at zero volts and that the output of P1 is therefore at +5 volts. Under these circumstances, C2 has charged through R3, D2, and through R4 so that V3 is close to 5 volts. This same voltage is rapidly applied via P2 and P3 to the second input of P1 whose output consequently switches to zero volts.

C2 therefore discharges through R4 at a rate determined by the time constant R4C2.

It may be noted here that the resistance of R3 is selected to be much lower than that of R4 so that C2 charges very quickly, essentially via R3 and D2, whereas it discharges much more slowly, solely via R4 since D2 is then non-conducting.

As a result C2 discharges very slowly and the voltage V3 passes slowly from 5 volts to 0 volts. When the low threshold VS of inverter P3 is reached, its output switches over as does the output of P2, and after this double inversion, 0 volts is obtained on the second input to P1. The output of P1 therefore rises towards 5 volts so long as the 0 volt pulse applied to its second input lasts, and C2 charges quickly again. It may be observed here that the components P1, P2, and P3 must operate as Schmidt triggers, i.e. they must impart a degree of hysteresis in the feedback loop in order to enable this type of operation to take place.

This circuit thus constitutes an oscillator which delivers a sawtooth signal varying between a high voltage determined by the duration of the charging stage (a function in particular of the response time of the gate) and of the time constant R3C2, and a low voltage equal to the lower threshold voltage VS of the inverter P3, with this taking place at a frequency substantially equal to 1/R4C2.

Referring again to FIG. 2a, the case is shown of a 0-volt voltage pulse I being applied to the first input P1 while C2 is discharging (instant $t_0$) with the second input of P1 thus being at 5 volts. This causes the output of P1 to switch immediately to +5 volts and C2 to charge again, so that V3 rises suddenly up to value (of about 4 volts) which is determined essentially by the duration of the 0-volt voltage pulse in the signal V2.

Thereafter C2 begins to discharge again.

It can be seen in FIG. 2a, that the following 0-volt pulse (instant $t_4$) is long enough after the first 0-volt pulse for V3 to have reached the threshold voltage VS earlier, thereby causing P3 to switch over (instant $t_2$).

As a result, the output of P3 switches from 0 volts to +5 volts. This voltage pulse is applied at the signal B to the output S and constitutes a reinitialization pulse I' for the associated microprocessor.

Simultaneously, V3 increases again until it reaches a value which is determined by the charging time of C2, and which in the present case is about 2.5 volts. The lower threshold of P3 is therefore reached again in the present case at instant $t_3$, and a new reinitialization pulse I' is generated, and C2 charges again.

At instant $t_4$ the first input of P1 again receives a 0 volt pulse, and V3 then rises to about 4 volts and the cycle continues as before.

Thus, when $F_A$ is lower than a given frequency $F_{MIN}$ (in the present case the natural frequency of the oscillator as determined, inter alia, by the time constant R4C2), it can be seen that reinitialization pulses I' are applied to the microprocessor.

FIG. 2b shows the behavior of the circuit when $F_A$ is greater than $_{MIN}$.

In this case, V1 and V2 vary as described above (with instants $t'_0$, $t'_1$, and $t'_2$ corresponding respectively to instant $t_0$, $t_1$, and $t_4$ of FIG. 2a, except insofar as the time scale is different), however the pulses I is applied to $>F_{MIN}$. As a result, at least one such pulse I is applied to the first input of P1 before the gates P2 and P3 switch over, i.e. before V3 has reached the lower threshold voltage of P3, for thus causing V3 to increase by recharging C2. Consequently, the signal V3 shows voltage is regularly "regenerated" by the voltage pulses from V2 never reaches the lower threshold of P2, so the output of P2 remains continuously at 0 volts.

Thus, in this case, no reinitialization pulses are ever generated.

With reference now to FIG. 2c, circumstances are described in which the frequency $F_A$ is greater than a second threshold $F_{MAX}$ which is defined below.

In this case, the frequency $F_A$ is such that the stage during which V1 rises from 0 volts to 5 volts as triggered by A switching from 0 to 5 volts (instant $t''_0$) does not have time to be completed before A switches back to zero (at instant $t''_1$), with V1 thus being taken back to 0.

In the circumstances illustrated, a voltage of only about 2.5 volts is reached. Thus, the voltage V2 which was more or less stabilized on 5 volts during the stage when A was at 5 volts drops only to about 2.5 volts at instant $t''_1$, and consequently reaches about 2.5 volts. During the following charge of C1, V2 returns towards +5 volts.

As a result, the lower threshold (e.g. about 2 volts) of the first input of P1 is never crossed, and this gate behaves as thought the logic level of the first input remains continuously at the high level.

The voltage drops at V2 are therefore not treated by the gate P1 as pulses I for modifying the behavior of the oscillator, so the oscillator operates as described above on the assumption that the first input to P1 was maintained continuously at +5 volts.

This means that C2 can discharge freely until V3 crosses the lower threshold of the gate P3 (at instant $t''_3$), and this phenomenon repeats periodically at a rate equal to the natural frequency of the oscillator.

As a result, reinitialization pulses are generated on the output S at a frequency equal to the natural frequency of the oscillator.

It may be observed here that the threshold frequency $F_{MAX}$ is determined both by the time constant R2C1 which determines the rate at which C1 charges, and by the effective level of the lower threshold of the first input to P1, i.e. the voltage at which this input is assumed, from the logic point of view, as having switched from high logic level to low logic level.

In conclusion, the circuit of the present invention is capable in an extremely cheap and reliable manner of detecting an operating defect in a microprocessor or the like as manifested by an abnormal variation in one direction or the other of the frequency of the signal A, whereupon the circuit applies a succession of reinitialization pulses to the microprocessor after a minimum waiting period. In addition, the above-described circuit has extremely low electricity consumption which may typically be of the order of a few hundreds of microamps.

Naturally, the present invention is not limited in any way to the embodiment described above and shown in the drawings, and the person skilled in the art can apply any variation or modification thereto in accordance with the spirit of the invention.

In particular, the various functions performed by subportions of the circuit shown in FIG. 1 may be performed by other, equivalent circuits without going beyond the scope of the invention.

Further, persons skilled in the art will be able to provide a circuit operating on the same principles as that described above in which high and low logic levels are interchanged with the voltage V3 varying in the opposite direction.

Finally, it may be observed that the device of the invention may not only be used to reinitialize a microprocessor whose operation is being monitored, as described above, but may also be used, as an alternative or in addition, to generate a warning signal in any appropriate form.

We claim:

1. A device for monitoring the operation of a microprocessor or the like, the device being capable of generating an error signal when the frequency of a signal derived from said microprocessor crosses a lower frequency threshold or an upper frequency threshold, wherein the device comprises:

an oscillator capable of producing a periodic voltage which varies monotonically from a starting voltage, and including a threshold circuit to which said monotonically varying voltage is applied and which is capable of generating an error signal on an output of the device each time said monotonically varying voltage crosses a determined voltage threshold, said oscillator also including a reset input which, on receiving a reset pulse, serves to return the monotonically varying voltage to a level closer to its starting voltage; and a treatment circuit for treating the derived signal and capable of applying reset pulses to said reset input at a frequency equal to the frequency of the derived signal when said frequency is not greater than the upper frequency threshold, and to apply no reset pulse when the frequency of the derived signal exceeds said upper threshold frequency; the rate at which said monotonically varying voltage varies being such that when said reset pulses are produced at a frequency lower than said lower frequency threshold, the time interval between two successive reset pulses is greater than the time interval required for the monotonically varying voltage to go from the starting voltage to the threshold voltage.

2. A device according to claim 1, wherein the oscillator comprises a capacitor, a charging resistor for charging the capacitor quickly, a discharging resistor for discharging the capacitor slowly, and a gate whose output controls charging and discharging of the capacitor, wherein the threshold treatment circuit is included in a feedback loop between the capacitor and one of the inputs of the gate, and wherein another input of the gate constitutes the reset input.

3. A device according to claim 2, wherein the charging resistor and the discharging resistor are connected in parallel between the output of the gate and a first terminal of the capacitor, a diode connected in series with the charging resistors, and the second terminal of the capacitor is connected to ground.

4. A device according to claim 2, wherein the feedback loop includes two logic inverters in series, with the inverter connected to the capacitor is a NAND gate.

5. A device according to claim 1, wherein the treatment circuit comprises a diode whose cathode is connected to the derived signal input and whose anode is connected to a first terminal of a first resistor and to a first terminal of a capacitor, the second terminal of the capacitor is connected to a first terminal of a second resistor and to the reset input of the oscillator, and the second terminals of the first and second resistors are connected to a DC voltage source.

6. A device according to claim 1, wherein the error signal is a reinitialization pulse for the microprocessor, or a succession of such pulses.

* * * * *